United States Patent [19]

Gonthier

[11] Patent Number: 4,788,430

[45] Date of Patent: Nov. 29, 1988

[54] CONTAMINATION AND IRRADIATION MEASURING METHOD AND A UNIVERSAL SENSOR FOR IMPLEMENTING SAID METHOD

[76] Inventor: Bruno F. Gonthier, Parc de Monteillon - 11, rue du Dr. Roomefort, 33160 Saint Medard en Jalles, France

[21] Appl. No.: 352

[22] Filed: Jan. 5, 1987

[30] Foreign Application Priority Data

Jan. 6, 1986 [FR] France .................................. 86 00081

[51] Int. Cl.⁴ .............................................. G01T 1/18
[52] U.S. Cl. ..................................... 250/376; 250/380
[58] Field of Search ............... 250/374, 376, 378, 379, 250/380, 390 R, 435

[56] References Cited

U.S. PATENT DOCUMENTS

| | | | |
|---|---|---|---|
| 2,695,363 | 11/1954 | Marvin | 250/374 X |
| 3,448,269 | 6/1969 | Dieval et al. | 250/435 X |
| 4,207,471 | 6/1980 | Coover | 250/378 X |
| 4,401,891 | 8/1983 | Lewiner et al. | 250/374 |
| 4,451,736 | 5/1984 | Cameron | 250/376 |

Primary Examiner—Gene Wan
Attorney, Agent, or Firm—William A. Drucker

[57] ABSTRACT

A method is provided for contamination and irradiation measurement and a universal sensor for implementing said process. The individual portable sensor of the invention includes an electret a first face of which is at least partially in contact with the fluid which it is desired to monitor and electrodes disposed opposite the second face. An electronic circuit measures the field variation of the electret in the zone opposite said electrodes. An aerolic circuit ensures a constant flow of fluid over the electret.

18 Claims, 1 Drawing Sheet

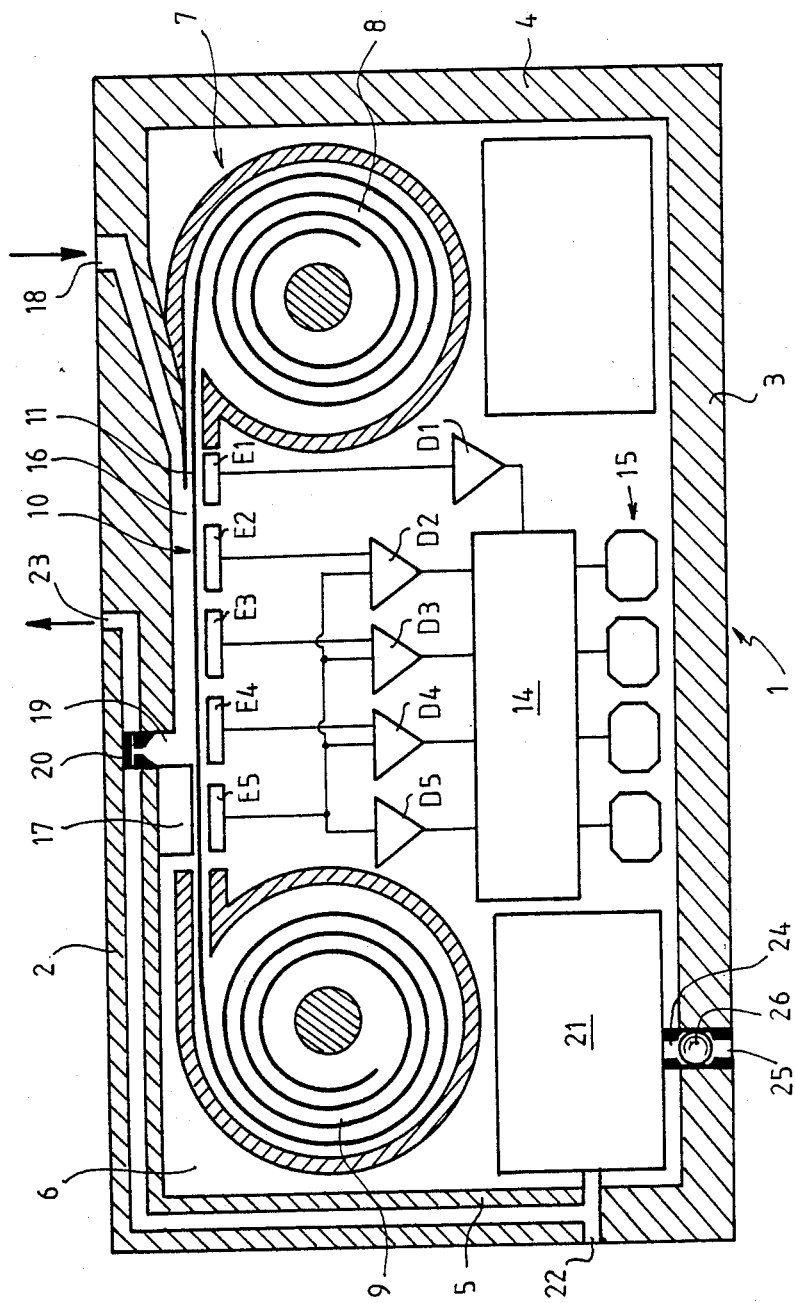

CONTAMINATION AND IRRADIATION MEASURING METHOD AND A UNIVERSAL SENSOR FOR IMPLEMENTING SAID METHOD

BACKGROUND OF THE INVENTION

1. Field of the Invention

The present invention relates to a method of measuring contamination and irradiation as well as a sensor for implementing this method.

It relates more particularly, but not exclusively, to the construction of a universal sensor of said type able to be constructed in a sufficiently miniaturized form so as to allow individual detection, for example for use by persons working in a radioactive environment who consequently run the risks of direct or indirect radiation by ionizing radiation, and/or contamination by radioactive substances in suspension.

2. Description of the Prior Art

At the present time there exists no portable individual sensor which may at the same time make irradiation or atmospheric contamination measurements in real time.

In fact, although measurement of irradiation may be made using individual portable apparatus such for example as pendosimeters, measurement of atmospheric contamination on the other hand requires relatively complex and expensive installations including necessarily:

- devices for taking air from the monitored premises having aerolic connections, which, because of a depression engendered by a turbine, conduct the air flows taken to a filter for retaining the matter in suspension;
- a detector disposed in the immediate vicinity of the filter and adapted for measuring the activity of the radioactive materials retained by the filter;
- a device for processing the signals delivered particularly for obtaining a magnitude representative of the activity per unit of volume of the premisis;
- means for isolating the detection assembly (filter/detector) from the radioactivity coming from outside, these means being usually in the form of relatively heavy and bulky lead enclosures, guard counters, etc. . . . ; and
- a device for periodically changing the filters.

It has proved in practice that these installations have a number of drawbacks.

First of all, the measurement made by these installations is not truly representative of the harmful effects at the individual level, particularly because the atmosphere which reigns in the premises is usually not homogeneous and since the individual may move whereas the sampling point remains fixed. This problem is considerably aggravated when the premises are equipped with a system of ventilation.

Another drawback of these installations consists in the fact that they necessarily require a device for dynamically entraining the air with a complex regulation system so as to obtain a constant flow rate. Because the entrained air flow must pass through the filter, it is then advisable to use a pump or a turbine which is relatively powerful and consequently expensive and space consuming.

To this drawback is added the fact that the filter clogs progressively while inducing a variable pressure loss which the regulation system will have to counterbalance so as to maintain a constant flow and avoid degradation of the measurement.

Furthermore, the installations at present used are subject to the problem of contamination of the detector, due to the presence of this latter facing the filter. At the present time, this problem can only be resolved by regularily changing the detector, since the decontamination of this latter is a delicate operation.

In conclusion, these installations are costly to purchase and to run, they are heavy and therefore not easy to handle and cannot be readily increased in number. Furthermore, they are not strictly reliable for protecting persons for the above mentioned reasons. In addition, they are relatively complex since they require a different detection chain for each type of radiation and, in particular for detection of the contamination $\alpha$, the contamination $\beta$, for neutron irradiation, $\gamma$ irradiation and for the detection of radioactive gases such as krypton or xenon.

The purpose of the invention is then to overcome all these drawbacks. For this it provides a method implemented by means of a relatively simple, inexpensive universal sensor which may be used individually and which is capable of simultaneously effecting the different types of detection mentioned above.

SUMMARY OF THE INVENTION

To arrive at this result, the invention combines in a novel and original way two very distinct properties of electrets (namely a dielectric sheet electrically charged in the vicinity of at least one of its faces) namely. the variation of the electric charge of the electret particularly under the effect of ionizing radiation and the mechanical properties of the electrostatic field produced by the electret.

Thus, more precisely, the method for measuring the contamination produced by radioactive materials in suspension in a fluid consists, in accordance with the invention, on the one hand in trapping the aerosols contained in the fluid through the electrostatic field produced by the electret, so that the radioactive fraction of these aerosols, creates pairs of ions in said fluid which will in their turn be trapped by said field, this trapping then causing discharge of the electret as a function of the number of ions collected and, on the other hand, in measuring, in real time, said discharge by means of an appropriate measuring device.

Such as defined above, this method then allows measurements to be made of contamination by materials in suspension (aerosols) since the trapping rate may be related by a simple mathematical relation to the initial concentration of radioactive aerosols in the fluid.

However, the method of the invention is not limited to this type of measurement alone, but further allows numerous other measurements to be made simultaneously and, first of all, the measurement of contamination by a radioactive gas such as krypton or xenon.

To this end, it is based on the discovery that in the case where the layer of fluid passing close to the "sensitive" face of the electret is moving in a predetermined direction, trapping of the radioactive materials in suspension takes place in a zone upstream of the electret with respect to the direction of movement of the fluid, whereas downstream of this zone the electret will not be influenced by these materials.

Thus, when the moving fluid contains a radioactive gas, the ionizing radiation which it emits will produce in the zone upstream of the electret an action which is added to that of the trapped materials, whereas in the downstream zone its action will be independent of that of said materials. Thus, by detecting the variations of electric charge in these two zones, it becomes possible to selectively detect the radioactivity of the materials in suspension and that of the gas. Similarly, in a case where only a radioactive gas is present in the layer of air, the two charge variations detected will be identical so that when the equality of these two variations is detected this means that there is only a radioactive gas present without contamination by radioactive aerosols.

The method of the invention also allows $\gamma$ radiation to be detected and, more particularly, the damage caused by such radiation at the level of the living tissues of the organism.

According to the invention, this detection is made in a zone of the electret, isolated from the fluid current with a view to the previously mentioned detections so that the electric charge of this zone of the electret will not be influenced by the gas and by the radioactive materials in suspension in this gas. In front of this zone it is then advisable to provide an element producing ionization similar to that which is effected in the skin. This $\gamma$ detection will further allow compensation of the measurements made in the other zones of the electret ($\gamma$ rays causing an homogeneous discharge of the whole of the electret).

The method of the invention further allows the detection of neutrons. It is in fact known that neutrons are not truly similar to the above mentioned $\alpha$, $\beta$, $\gamma$ radiations in that they are not directly ionizing. On the other hand, it is possible to cause them to react on a material such as boron which is activated under the effect of the neutrons, thus creating atoms emitting $\alpha$ radiations. Furthermore, it is necessary to slow these neutrons down beforehand by causing them to pass through a piece of hydrogenated material such for example as a suitably placed polyethylene ball.

Consequently, to carry out neutron detection, the method of the invention may include the detection of the variations of the electric charges of the electret in a zone separate from the above mentioned zones and isolated therefrom, this zone being associated with an element adapted for emitting ionizing radiation under the effect of the neutrons and with an element made from an appropriate material for slowing down the neutrons.

Of course, for the above mentioned reasons, the electret will be locally subjected to discharges which in the long run will make it inoperative. The invention then provides for detection of the discharge of the electret simply by comparison of the partial discharges detected in the different zones of the electret, in particular in said upstream and downstream zones and in an intermediate zone included between these two zones.

BRIEF DESCRIPTION OF THE DRAWING

The invention also relates to the devices for implementing the above described method one embodiment of which will be described hereafter by way of non limitative example with reference to the accompanying drawing in which:

The single FIGURE is a schematical section of a portable universal sensor adapted for making irradiation and atmospheric contamination measurements.

DESCRIPTION OF THE PREFERRED EMBODIMENT

Such as shown in this drawing, the sensor is housed in a case 1 of small dimensions, of the order of a packet of cigarettes. In this example, this case 1 has a parallelepipedic shape and includes an upper face 2, a lower face 3, two longitudinal sides parallel to the plane of the FIGURE and two parallel transverse sides 4, 5. Of course, the invention is not limited to this shape of case. It is obvious that this case could have a multiplicity of other shapes without modifying the principle of the invention.

Advantageously, this case 1 may have a mechanical structure comparable to that of a miniature camera and include a pivoting or removable lid giving access to a housing receiving a cartridge or cassette 7 similar to that of a photographic film cartridge or cassette having an electret feeding reel 8 and a receiving reel 9, these two reels being separated by an exposure area 10 where the electret 11 is guided at least laterally so as to present a flat face (substantially parallel to the upper face 2) at this position. In a way similar to that of a camera, this case may be further equipped with a mechanism for advancing the electret 11.

The electret 11 is therefore in the form of a flexible dielectric material strip, suitably charged at the level of its two faces (+ and − charges) and being windable on the feed reel 8 and/or the receiving reel 9. It has preferably on one of its faces (its face which is opposite the upper face 2 of case 1 in the exposure area 10), metallizations (not shown) corresponding to the different detection zones. In this example, the detection of the variations of the electric charges of the electret in the exposure zone 10 is provided by means of five electrodes E1 to E5 which define on the electret five successive detection strips between the feed reel 8 and the receiving reel 9. These detection strips extend from one edge to the other of the electret 11 parallel to the axes of rotation of reels 8, 9.

Each of these electrodes E1 to E5 is connected to a current detector D1 to D5 shown schematically by an operational amplifier which transmits information representative of the variations of the electrostatic field detected in the corresponding zone, to a microprocessor 14 processing the information delivered by the detectors D1 to D5 and causing selective display of the irradiation and contamination measurements made. This microprocessor 14 may be further adapted so as to emit an alarm signal when the result of these measurements exceeds a predetermined threshold. Similarly, an alarm signal may be provided for indicating that the part of electret 11 situated in the exposure area 10 is discharged. The display and alarm circuits which are within the scope of a man skilled in the art have not been shown in detail for the sake of clarity, but are schematized by the symbols 15.

Furthermore, the device described in this example includes an aerolic circuit for ensuring circulation of air over a part of the electret portion 11 situated in the exposure area 10, particularly in the zones where detection of contamination (gas+ aerosol) is made.

This aerolic circuit includes more particularly a circuit for circulating air over the exposure area of the electret, this circulation circuit including an air circulation chamber 16 between the exposure area 10 and the upper face 2 of case 1, this chamber extending from a first detection zone of the exposure area 10 of the electret 11 adjacent the feed reel and in line with electrode E1 but which is not in contact with the air flow passing through said chamber 16, as far as a second detection zone (electrode E 5) of the exposure area 10 of electret 11 adjacent the receiving coil 9 and which is also isolated from the air flow through a piece 17 made from a material capable of creating, under the action of the γ rays, an ionization similar to that which is effected in the skin of an individual.

The end of the circulation chamber situated on the same side as the feed reel communicates to the outside through an access orifice 18, whereas the end situated on the same side as the receiving reel is connected to the suction orifice 19 of a venturi 20 mounted in a pneumatic circuit, comprising a pressurized gas reservoir 21 housed inside case 1, a pipe for the circulation of pressurized gas from this reservoir 21, equipped with a flow regulation device (needle 22), and connected to the inlet of the venturi 20. A discharge pipe 23 opening to the outside discharges to the outside the mixture of the gas delivered by the reservoir 21 and of the air sucked into the circulation chamber 16 by the venturi 20. The reservoir further includes a filling orifice 24 connected to a refill pipe 25 opening outside and having a non return valve 26. Of course, the invention is not limited to this flow principle, the flow being able to be provided for example by a microturbine disposed in series in the pneumatic circuit.

As mentioned above, the sensor includes five measurement electrodes two of which E1, E5 are assigned to two detection zones isolated from the air flow and the other three of which E2, E3, E4 succeed each other in line with the exposure area 10.

The operation of the above-described sensor is then as follows :
 initially the sensor is loaded with an empty and charged electret cartridge 7 or cassette. At the same time, the reservoir is filled with pressurized gas 21. Then the sensor is set in a way similar to a photographic camera by bringing a first exposure area 10 of the electret 11 between the feed reel 8 and the receiving reel 9 in line with the measurement electrodes E1 to E5.

Under the effect of the gas flowing through the venturi, the air present in the circulation chamber 16 is sucked up and a substantially constant air flow is created in this chamber 16 passing successively over the detection areas of electret 11 situated in line with electrodes E2, E3 and E4.

Because of the electrostatic field of the electret, the ionized matter in suspension contained in the air flow which enters the circulation chamber 16 is attracted and trapped essentially in the detection zone situated in line with the electrode E2. Consequently, the radiation emitted by this matter will cause the creation of ion pairs which will in their turn be trapped by the electrostatic field. These ions will then cause a progressive discharge of the electret in this zone as a function of the number of ions collected. Analysis by the microprocessor of the signal representative of this discharge produced at the outlet of the detector then allows the value of the detected contamination to be obtained. This value may be displayed or even serve for triggering an alarm signal in the case where it exceeds a predetermined value.

Concurrently, a circuit including the electrode E1 and the electric field detector D1 will allow a signal to be obtained representative of the initial electrostatic field of the electret during positioning of a new exposure area 10. From this signal a first correction of the measurements may be made and/or information obtained concerning the charge level of the electret. In fact, the charge of the electrode contained in the feed reel 8 is not strictly constant in time. It is in particular subject to variations generated particularly by external irradiations.

These variations may be limited by protecting the feed reel by means of a lead casing (it being understood that in the case of individual portable sensors, this protection will remain insufficient for completely solving this problem).

In the case where the detection area of the electret is subjected to the action of radioactive gases, a homogeneous discharge of the whole detection area of the electret takes place. This discharge may be measured by electrode E4 beceause the detection zone of the electret corresponding to this electrode is not influenced by the contamination (the radioactive particles in suspension being trapped at the level of electrode E2). On the other hand, at the level of this electrode E2, the charge variation detected will be representative of the cumulative effect of the radioactive gases and of the contamination. The value of the contamination will then be obtained by subtracting from the measurement obtained by electrode E2 the measurement made by electrode E4.

As mentioned above, electrode E5 associated with element 17 serves for measuring the γ radiation under a tissue equivalent. It is clear that this measurement may also serve for counterbalancing the measurement made at the other electrodes and, in particular, that made by electrode E4. It then becomes possible to carry out a selective measurement of the radiation.

In the example shown, the sensor further includes an additional electrode E3 situated between electrode E2 and electrode E4 and covering an intermediate zone of the exposure area 10 of electret 11.

Initially, when the charge of the electret in the exposure area 10 is at its maximum level, this intermediate zone will only be slightly influenced by the contamination of the air, because the ionized matter in suspension will already be trapped at the level of electrode E2.

Nevertheless, the contamination measurement made at this electrode E3 may be added to the measurement made at electrode E2.

On the other hand, in the long run, because of the weakening of the electrostatic field, the trapping rate provided at the level of electrode E2 will decrease progressively whereas that of the intermediate zone (electrode E3) increases.

When the charge variation detected at electrode E3 becomes equal to that detected at electrode E2 while remaining greater than the charge variation detected at electrode E4, it will be considered that the detection area of the electret corresponding to electrode E2 is discharged and that consequently it becomes necessary to advance the electret so as to use a new detection area. Thus, the microprocessor may advantageously include a logic based on this finding so as to set off a signal indicating that the detection area of the electret at present in use is discharged.

Moreover, the detection area of the electret may further include a zone for detecting neutrons, associated with an additional electrode and with an element made from a hydrogenated material such as a polyethylene ball serving for slowing down the neutrons.

An important advantage of the above described sensor consists in that it gets over the problem in a very simple way of errors of measurement due to the daughter products of the isotopes of the radon which, as is known, do not form a troublesome cause of contamination.

Now, in the usual technique, it is necessary, for discriminating the emissions due to the radon from those due to the desired aerosols, to use spectrometric detectors associated with amplitude selectors.

However, because the energy spectrum of the radiation emitted by the radon is very close to that of the $\alpha$ emissions of the plutonium and because, depending on the position of the detector with respect to the emission source, there occurs in conventional systems partial superimposition of the two spectra, it is advisable then to use expedients such as finned grids, depressant systems, etc. . . . so as to obtain a satisfactory result. It is clear that this arrangement increases the complexity and consequently the cost of the installation.

On the other hand, in the sensor of the invention, the aerosols are directly trapped on the detector (the electret playing the dual role of trapping and detection), so that the radiations emitted by the radon remain in the energy band which is proper to them without encroaching in the energy band of the a radiations. A simple spectral analysis is sufficient for distinguishing these two types of radiation.

Of course, the invention is not limited to the structure of the detector described above, and numerous variants obvious for a man skilled in the art may be contemplated.

Thus, for example, it would be possible to replace the electret cartridge or cassette system by a "plate" type system, that is to say using interchangeable electrets having the dimensions of the exposure area. In this case, a mechanism for changing the electret once discharged may be provided.

Similarly, the electret could be circular in shape, the electrets then being in the shape of concentric rings or in the form of annular sectors. In this latter case, the change of exposure area could be obtained by a relative rotation of the electret and of the measurement electrodes.

What is claimed is:

1. A method of measuring the contamination of a fluid having radioactive aerosols in suspension which emit radioactive radiations, said method comprising the following steps:
   i. attracting and trapping the radioactive aerosols with pairs of ions created by said radiations on an electrostatically charged face of an electret, made of dielectric material, by means of the electrostatic field generated by the electret in said fluid, such trapping causing a progressive discharge of the electret depending on the number of ions collected and on an interaction of the radiation emitted by the trapped aerosols with the dielectric material of the electret, and
   ii. measuring this discharge so as to deduce therefrom a useful parameter of said contamination.

2. The method as claimed in claim 1, wherein said useful parameter is the concentration of the radioactive aerosols in the fluid.

3. The method as claimed in claim 1, wherein fluid is caused to flow, at a constant rate, over said face of the electret.

4. The method as claimed in claim 1, wherein said fluid comprises radioactive gases, said method further comprising the following steps:
   i. causing the fluid to flow over the said face in at least one given direction and sense;
   ii. measuring variations of the electrical field in two respective separate zones of the electret;
   iii. using the measurement made in the zone situated downstream with respect to said sense for determining the radioactivity of said radioactive gases;
   iv. using the measurement made in the zone situated upstream, jointly with the measurement made in the zone situated upstream, for determining the contamination.

5. The method as claimed in claim 1, further including, for determining a $\gamma$ radioactivity, the detection of variations of the electrostatic field of the electret in a separate zone protected from a contact with the fluid by an element producing under the effect of the $\gamma$ rays an ionization similar to that which would be effected in the skin of an individual.

6. The method as claimed in claim 5, further including a compensation of the measurements of contamination by radioactive substances in suspension and by radioactive gases, by means of said detection of variations.

7. The method as claimed in claim 1, further comprising, for determining neutrons, a detection of variations of the electrostatic field of the electret in a separate zone which is not in contact with the fluid, this zone being covered by an activation material and by an element made of a hydrogenated material capable of slowing down the neutrons.

8. The method as claimed in claim 4, further including a detection of the variations of the electrostatic field of the electret in an intermediate zone between said upstream zone and said downstream zone, and a determination of the discharge of the electret by comparing the field variations in said zones.

9. A sensor for measuring the contamination of a fluid having radioactive aerosols in suspension which emit radioactive radiations, said sensor comprising an electret having a first face electrostatically charged which is at least partially in contact with said fluid and which generates an electrostatic field in said fluid, so as to attract and to trap the radioactive aerosols, and a second face located opposite to the first face, an electrode facing a zone of said second face and an electronic circuit for measuring the variation of the field of the electret in the said zone.

10. The sensor as claimed in claim 9, further comprising an aerolic circuit adapted for ensuring a flow of fluid at constant rate over said first face.

11. The sensor as claimed in claim 9, further comprising two electrodes facing two successive zones of the said second face, namely: an upstream zone and a downstream zone, considering the flow of the fluid, these two electrodes being connected respectively to two field variation measurement circuits, the electrode assigned to the downstream zone being connected to first means for measuring the variations of the field of the electret in this downstream zone, which are representative of an activity of gases contained in said fluid;

the electrode assigned to the upstream zone being connected to second means for measuring the variations of the field of the electret in this upstream zone, and a processing unit for determining the contamination by radioactive aerosols in suspension in said fluid from the measures effected by said first and second measuring means.

12. The sensor as claimed in claim 9, further comprising means for isolating a zone of the electret from said fluid, an element serving as tissue equivalent for the γ rays which covers one side of said zone and a further electrode connected to an electrostatic field variation measurement circuit which determines a parameter representative of a γ radiation and a harmful effect on living tissue of this γ radiation.

13. The sensor as claimed in claim 12, further comprising a circuit for providing compensation of the measurements made on the electrode used for determining the contamination, from said parameter representative of the γ radiation.

14. The sensor as claimed in claim 11, further comprising a supplemental electrode facing an intermediate zone of the second face of the electret between said upstream and downstream electrodes, this supplemental electrode being connected to a field variation measurement circuit, as well as a logic circuit, adapted for detecting the discharge of the electret from the field variations detected in said upstream, downstream and intermediate zones.

15. The sensor as claimed in claim 9, further comprising means for isolating a zone of the electret from said fluid, an activation material covering said zone on one side, an element made from a hydrogenated material for slowing down the neutrons and an electrode connected to a field variation measurement circuit.

16. The sensor as claimed in claim 9, wherein the electret is in the form of a strip and is mounted in a cartridge including a feed reel, and a receiving reel, these two reels being separated by an exposure area and it has on the said second face metallizations extending in different detection zones.

17. The sensor as claimed in claim 16, including a case having a removable lid giving access to a housing adapted for receiving said cartridge, said case having electrodes disposed in front of the second face of the electret in the exposure area and an aerolic circuit including a fluid flow chamber housed in the case and partially limited by the exposure area of the electret, this chamber opening outwardly on a same side as one of the reels and communicating with a suction pipe situated on the side of the other reel.

18. The sensor as claimed in claim 17, wherein said suction pipe is connected to the suction orifice of a venturi fed with a pressurized gas coming from a reservoir housed in the case and possible reloadable.

* * * * *